Figures 1, 2:
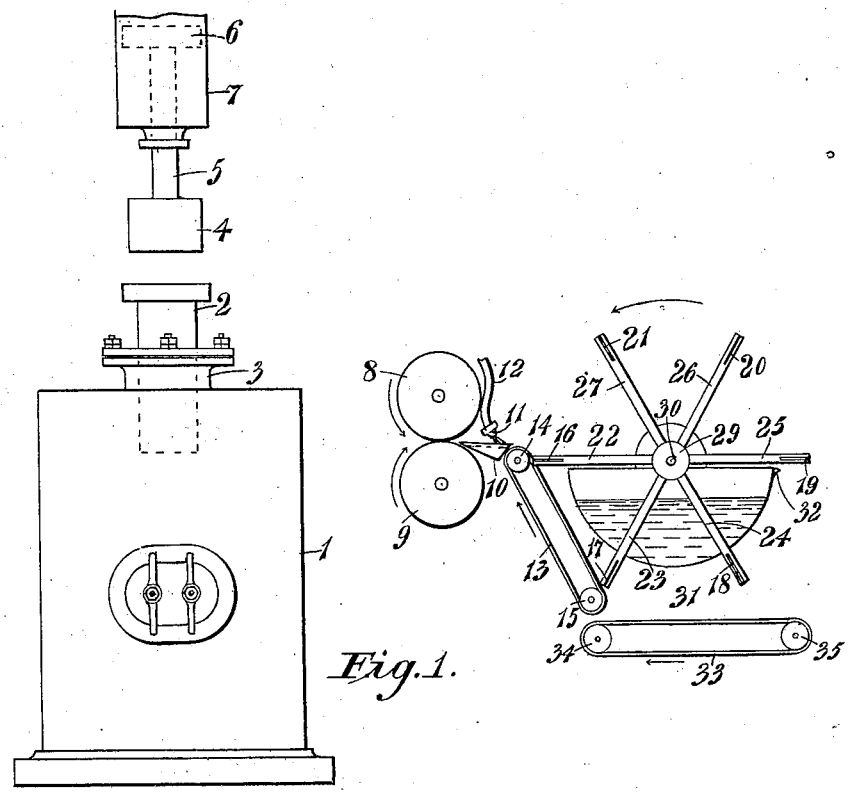

No. 884,401.

PATENTED APR. 14, 1908.

K. MATTHEWS.
PROCESS OF PREPARING FIBERS.
APPLICATION FILED MAR. 26, 1906.

Witnesses.

Inventor:
Keith Matthews.
By
Attorney.

THE NORRIS PETERS CO., WASHINGTON, D. C.

UNITED STATES PATENT OFFICE.

KEITH MATTHEWS, OF AUCKLAND, NEW ZEALAND.

PROCESS OF PREPARING FIBERS.

No. 884,401.

Specification of Letters Patent.

Patented April 14, 1908.

Application filed March 26, 1906. Serial No. 308,169.

*To all whom it may concern:*

Be it known that I, KEITH MATTHEWS, a subject of His Majesty the King of Great Britain and Ireland, residing at Grafton Road, Auckland, in the Provincial District of Auckland, in the Colony of New Zealand, have invented certain new and useful Improvements in Processes of and Apparatus for Preparing Fibers, of which the following is a specification.

The invention relates to the production of fiber from fiber-bearing plants such for instance as *Phormium tenax*.

Hitherto it has been usual when manufacturing fiber from *Phormium tenax* and the like to macerate or beat the flax blades to remove the vegetable matter from the fiber. I have found that this removal of the vegetable matter may be effected by the employment of a jet of water directed upon the flax blade under very high pressure, the result being that the fiber is stripped in a far more perfect manner than hitherto while it is not injured as is generally the case. Before the flax blade is exposed to the jet it is preferable to bruise the vegetable matter upon it and this can be effected by passing it under stampers with either a smooth or a roughened or broken surface or between pressing rollers or by subjecting it to great pressure such for instance as in a closed chamber containing water or other liquid under pressure, the pressure being applied gradually as by a pump and hydraulic accumulator or suddenly as by a weight falling upon a plunger or ram. After the action of the jet it may be in cases advisable to subject the fiber to the action of revolving beaters for the purpose of loosening the fiber and removing any pieces of adherent vegetable matter.

Apparatus by which my invention may be carried into practical effect is illustrated diagrammatically in the acompanying drawing wherein:—

Figure 1 is a side elevation, and Fig. 2, a plan.

When "*Phormium tenax*" is being dealt with the leaves to be treated are first placed within the cylinder 1 which is fitted with the plunger ram 2 passing through a stuffing box 3 and is filled with water. A weight 4 which is connected to the rod 5 having a piston 6 working in the steam cylinder 7 is raised by admitting steam beneath the piston and then allowed to fall upon the top of the ram 2 with the result that a great and sudden pressure is brought to bear upon the flax. In practice I have employed a pressure of about 4 tons per square inch.

When other descriptions of vegetable leaves are being treated having an epidermis less tough than *Phormium tenax* it may be permissible to use a gradual pressure obtained by the employment of an hydraulic accumulator of ordinary type which is charged by the water pump.

When *Phormium tenax* is being operated upon the pressure should not be less than 1500 lbs. per square inch. The flax blades are removed from the cylinder 1 and passed between feed rollers 8 and 9 and out upon a table 10 which is preferably made of metal and has a tapering groove $27^A$ in which the blade lies. Water under high pressure of not less than 1000 lbs. per square inch is projected from a nozzle 11 which receives its supply through a pipe 12 from an accumulator or from other source producing the required pressure. The flax passes over the end of the table upon an endless elastic traveling apron 13 which is made of rubber or other suitable material and passes over the rollers 14 and 15 one or the other of which is revolved from any convenient source of power. Wipers 16, 17, 18, 19, 20 and 21 are carried at the ends of pairs of radial arms 22, 23, 24, 25, 26 and 27 which project from bosses 28 and 29 fixed upon the spindle 30 which is mounted in bearings so as to be revoluble from any convenient source of motion.

There is a pair of arms for each wiper which have rounded edges and are arranged to press the fiber as it passes upon the apron and cause it to travel therewith.

The trough 31 of semi-circular section is arranged between the wiper arms and receives waste water from the nozzle 11 and debris brought over thereby, overflow passing off over a lip 32.

The endless traveling band 33 passing over rollers 34 and 35 conducts away the finished fiber.

What I do claim and desire to secure by Letters Patent of the United States is:—

1. A process for the treatment of vegetable fiber consisting in, first bruising the vegetable matter of the plant blade, and secondly removing the said vegetable matter by subjecting the blade to the action of a jet of water at high pressure which is caused to impinge upon it for the purpose of removing the vegetable matter from the fiber, substantially as set forth.

2. In a process for the treatment of vegetable fiber, steps consisting of first subjecting the plant blade to hydraulic pressure for the purpose of bruising vegetable matter upon it and secondly in subjecting the blade to the action of a jet of water emitted, under high pressure, through a nozzle for the purpose of removing vegetable matter from the fiber substantially as specified.

In testimony whereof I have signed my name to this specification in the presence of two witnesses.

KEITH MATTHEWS.

Witnesses:
  H. L. GOODE,
  N. H. LANG.